United States Patent [19]
Backhus et al.

[11] Patent Number: 5,893,225
[45] Date of Patent: Apr. 13, 1999

[54] MOBILE DEVICE FOR WORKING AND/OR MOVING HEAPS OF MATERIALS (RICKS), AND CLEARING APPARATUS PREFERABLY PROVIDED FOR IT

[75] Inventors: Friedrich Backhus; Stefan Gerdes, both of Edewecht, Germany

[73] Assignee: Friedrich Backhus Kompost-Technologie, Edewecht, Germany

[21] Appl. No.: 08/727,496

[22] PCT Filed: Mar. 10, 1995

[86] PCT No.: PCT/DE95/00332

§ 371 Date: Oct. 11, 1996

§ 102(e) Date: Oct. 11, 1996

[87] PCT Pub. No.: WO95/28368

PCT Pub. Date: Oct. 26, 1995

[30] Foreign Application Priority Data

Apr. 13, 1994 [DE] Germany ............... 44 12 637

[51] Int. Cl.$^6$ .................. A01C 3/00; A01D 55/00
[52] U.S. Cl. .................................... 37/416; 404/91
[58] Field of Search ..................... 37/350, 91, 94, 37/385, 384, 386, 387, 411, 416, 417, 419, 410, 908, 263; 172/532, 297, 817, 811, 119, 122; 404/90, 91

[56] References Cited

U.S. PATENT DOCUMENTS

| | | | |
|---|---|---|---|
| 2,481,679 | 9/1949 | Miller et al. | 37/387 X |
| 2,748,535 | 6/1956 | Skromme et al. | 172/119 |
| 3,015,258 | 1/1962 | Apel et al. | 37/350 X |
| 3,326,395 | 6/1967 | Williams et al. | 37/412 X |
| 3,328,902 | 7/1967 | Hanson | 37/350 |
| 3,510,073 | 5/1970 | Mailliard | 404/91 X |
| 3,548,956 | 12/1970 | Hochstetler | 172/811 S |
| 3,651,588 | 3/1972 | Hanson | 37/386 |
| 3,858,814 | 7/1975 | Wagner, Jr. | |
| 4,011,023 | 3/1977 | Cutler | 404/91 X |
| 4,186,968 | 2/1980 | Barton | 404/90 X |
| 5,114,267 | 5/1992 | Smith et al. | 404/91 X |
| 5,259,692 | 11/1993 | Beller et al. | 404/90 |

FOREIGN PATENT DOCUMENTS

| | | |
|---|---|---|
| 346642 | 5/1989 | European Pat. Off. . |
| 2356613 | 6/1977 | France . |
| WO 94/01995 | 2/1994 | WIPO . |

*Primary Examiner*—Thomas B. Will
*Assistant Examiner*—Robert Pezzuto
*Attorney, Agent, or Firm*—Collard & Roe, P.C.

[57] ABSTRACT

The invention relates to a mobile device for working and/or moving heaps, preferably stacked in the manner of an embankment, of compostable materials (ricks) or of materials which are suitable for a landfill, comprising travelling gear which can be moved on two tracks, an implement which can be driven in a rotating fashion essentially transversely with respect to the direction of travel within the space between the tracks of the travelling gear, and two clearing apparatuses which are mounted in front of the two tracks of the travelling gear in the direction of travel. Furthermore, the invention relates to a clearing apparatus for clearing material on a track of a mobile device. The invention is based on the object of developing a device and an associated clearing apparatus of the aforesaid generic type in such a way that they can be realized in a particularly compact fashion. The object is achieved according to the invention in that each clearing apparatus comprises a clearing blade which can be pivoted from a position pointing approximately in the direction of travel into the space between the tracks into a position approximately transverse with respect to the direction of travel and can be simultaneously raised automatically by an adjustment angle.

11 Claims, 7 Drawing Sheets

MOBILE DEVICE FOR WORKING AND/OR MOVING HEAPS OF MATERIALS (RICKS), AND CLEARING APPARATUS PREFERABLY PROVIDED FOR IT

The invention relates to a mobile device for working and/or moving heaps, preferably stacks in the manner of an embankment, of compostable materials (ricks) or of materials which are suitable for a landfill, in particular for organic processing, comprising a travelling gear which can be moved on two tracks, an implement which can preferably be driven in a rotating fashion and is arranged essentially transversely with respect to the direction of travel within the space between the tracks of the travelling gear and within a tunnel for the material to pass through, and two (track) clearing apparatuses which are mounted in front of the two tracks of the travelling gear in the direction of travel, take up approximately the width of the respective track and force the material located in front of the tracks into the space between the tracks, in which case each clearing device comprising a blade is capable of being pivoted and also raised from a working position pointing approximately in the direction of travel into a position of rest approximately transverse with respect to the direction of travel.

A device of the abovementioned generic type is known from the European Patent 0 346 642.

A device of the generic type serves to work preferably compostable material, which is heaped in the form of an embankment or a plurality of parallel embankments. The device is realized in its front view, which however in road traffic forms the side view, essentially in the form of a letter C, U or V with the opening at the bottom, in that namely the device can be moved on two tracks, the device being realized in its entirety approximately in the shape of a gate and spanning the space between the tracks such that the two tracks can run, and can be moved, to the left and right of an embankment-like heap, and the embankment-like heap itself can run within the arch of the gate through the tunnel. In order to work the heaped-up material, the device is moved from one end of the embankment-like heap to the other end. The implement, which is realized essentially in the form of a roller which can be driven so as to rotate about its longitudinal axis, extends transversely with respect to the direction of travel in the tunnel for the embankment-like heap to pass through, the said roller having arranged on its outside tools, for example worms, teeth, plates, blades or the like which mix, churn up or throw up the material to be worked and, in doing so, also displace it counter to the direction of travel so that the embankment-like heap is moved longitudinally in each case by a specific linear measure as a result of the working of the material of the said heap. In the case of compostable material, the working of the material serves in particular to aerate it in order to promote aerobic microorganisms and suppress anaerobic microorganisms. However, such a device is certainly not only used to work pure shredder material or the like; it may also be used to work other materials which are suitable for a landfill, for example soils which may be interspersed with foreign bodies.

The device of the generic type also has clearing apparatuses in the region of its two tracks, the said clearing apparatuses being mounted in front of the travelling gear in the track areas in order to force any material which may be located in, or have fallen down into, the tracks (back) into the space between the two tracks, that is to say onto the embankment-like heap, in order to avoid compaction by the travelling gear. The known device from the quoted European patent has, for this purpose, an active clearing apparatus, for example clearing tools rotating in front of a guiding blade.

When they are not needed, for example when manoeuvring the device, the clearing apparatuses of the known device can be pivoted from their working position in which they point approximately in the direction of travel, into a position of rest in which they point outwards approximately transversely with respect to the direction of travel. Moreover, they can be raised to avoid striking any unevennesses. Nevertheless, they may interfere with the manoeuvring, for example turning, of the device even in this position of rest.

The invention is therefore based on the object of developing a device of the generic type mentioned at the beginning such that it can be realized in a particularly compact fashion so that the highest possible percentage of the overall width of the device is provided as working width for the implement and, nevertheless, it is also possible to pivot the clearing devices in a space-saving fashion from their working position into a position of rest in which they do not interfere with the manoeuvring of the device.

The object is achieved according to the invention in that each blade, realized as a clearing blade, can be pivoted into a position of rest into the space between the tracks and can be simultaneously raised and pivoted into the position of rest by virtue of the fact that during pivoting it can be adjusted by an angle relative to the ground such that it projects upwards in the direction of its free end.

The clearing blade of the device according to the invention can thus be pivoted out of its working position, in which it points in the direction of travel, into the space between the tracks into a transverse position of rest and can be simultaneously raised by an adjustment angle, so that the two clearing blades present do not get in the way in particular when maneouvring, for example turning the device, in that they neither protrude forwards, which minimizes the required turning space of the device, one track laying gear unit being able to turn on the spot, nor interfere with any possible unevennesses or obstacles since the clearing blades are simultaneously pivoted up.

Moreover, the clearing apparatuses of the device according to the invention can advantageously be made substantially narrower, with regard to the working position, in comparison with the known, quoted device, since an active clearing apparatus is replaced by a passive clearing apparatus, in that, in place of active clearing tools and a guiding blade, use is made of a clearing blade which is capable of operating effectively in itself and which, for clearing, does not require any kind of independent drive which takes up space. The clearing blade can therefore be made very much narrower. This fact can be utilized to increase the working width of the implement, in that the tracks themselves are also made narrower, so that the width of the clearing blade is aligned with the track. Such a narrow construction of the track is possible in particular when a track laying gear unit is used because the driving chains or travelling chains can be made relatively narrow. However, it is also conceivable to use wheels.

According to preferred developments of the device according to the invention, in order to raise the material to be cleared, each clearing blade has a shovel-like slope which rises from its front end to the rear, is open at its front and on its inside and is bounded on its outside and at its rear by a guide face for the material, which guide face runs transversely in its course from the outside of the slope essentially in an arc into a [lacuna] at the rear and points and leads into the space between the tracks. The slope of the clearing blade is preferably bevelled at its front in such a way that it tapers to a point towards its outside.

A clearing blade which is realized in such a way digs into material which may block the track, raises the material and forces it back onto the embankment-like heap, that is to say it is completely active with regard to the working performance even if this permits moving tools to be dispensed with for the sake of a narrower working width. The arcuate course of the guide face can be realized by straight and planar partial guide sections which are arranged at an angle with respect to one another and follow the course of a polygon, so that the guide face can be composed relatively simply and robustly from metal plates or the guide face can be produced by folding one plate a number of times.

A simultaneous pivoting in and pivoting up of the clearing blades is achieved in the device according to the invention in an extremely space-saving fashion in that the relevant clearing blade only has to be pivoted about a single pivot-axis line of action which is inclined with respect to the vertical in the direction of travel. As a result of this inclined pivot axis or pivot-axis line of action, pivoting in and simultaneous pivoting up of the clearing blade is possible automatically, essentially only the corresponding pivot axis being required as well as, for example, a working cylinder which is also to be realized and arranged in a compact fashion as activation element.

Even if the device works forward in the direction of travel, a clearing blade which points in the direction of travel could certainly strike against an obstacle. In order to prevent this from adversely effecting the work procedure, it is desirable that, in this case also, it be possible to raise the clearing blade by an adjustment angle, which is the case according to a development of the device according to the invention.

This possibility also is provided particularly advantageously with the device according to the invention, again in a particularly compact, space-saving fashion in that rather than using a continuous pivot axis to define the pivot-axis line of action for pivoting in the clearing blade, use is made merely of two coupling points which are not connected to one another, one coupling point, preferably the upper coupling point, of which can itself in turn be pivoted with respect to the other coupling point, preferably the lower coupling point, over an arc. As a result of this pivoting capability of one of the coupling points, the clearing blade which points in the direction of travel can be correspondingly raised, in that the inclination of the pivot-axis line of action is changed. This pivoting can take place, for example, about a pivot spindle or the like, which is to be made relatively small. The non-pivotable coupling point can be, for example, realized in a very compact fashion as a ball-and-socket joint.

For the entire raising and pivoting capabilities of the clearing blade, only two to three attachment points, which can be made relatively small, are thus necessary for the clearing blade. At the same time, the clearing apparatus can, as a whole, be made very robust and reliable. Preferably, there is provision for the raising of the clearing blade into the working position to take place counter to a restoring spring force, so that the clearing blade always drops down again automatically after overcoming an obstacle.

The raisable and pivotable clearing blade is preferably activated with one to two working cylinders as activation elements. In the device according to the invention, these activation elements are particularly advantageously also arranged in the vertical plane of the respective track, so that it is also the case that these activation elements do not take up any space which would be at the expense of the working width of the implement. Therefore, the clearing blade itself is advantageously made as narrow as possible. The track of the travelling gear itself is made correspondingly narrow and the activation elements for activating the clearing blade are additionally also accommodated in the plane of this narrow track. This is possible in a particularly favourable way according to one development of the invention in that the travelling gear for each rack has a driving chain, and in that elements of the associated clearing blade are accommodated essentially within the wrap area of the driving chain.

A particularly favourable space for this is made available according to one development of the invention in that each of the two driving chains has in each case chain covers which protrude on both sides beyond the respective chain width, and in that at least some of the elements for activating and coupling the clearing blade arranged in front of this driving chain are accommodated in the wrap area of the protruding section of the chain covers which point inwards into the space between the tracks. This means that the chain covers are at maximum the same width as the clearing blade mounted in front of them, but the actual driving chain itself may be made even narrower, so that a larger wrapping radius is available for accommodating elements in the wrap area of the chain covers than in the wrap area of the driving chain itself.

It is therefore possible to maintain that, in the device according to the invention, every cubic centimetre of available space counts and is used as far as possible for arrangements.

In particular, the two coupling points which are not connected to one another and which define the pivot-axis line of action of a clearing blade may be advantageously accommodated, when a chain drive is used, in such a way that, in order to define the pivot-axis line of action of the clearing blade, the lower coupling point is arranged within the wrap of the associated driving chain, while the upper coupling point is arranged above the wrap, which would not be possible in the case of a continuous pivot axis, this, as it were, interrupted pivot axis ensuring however even better movement possibilities of the clearing blade than an uninterrupted axis.

Even the vehicle frame or frame of the device is made as thin-walled as is possible in order to save space. There is thus the risk of the device frame for the clearing blades which have been moved into the working position not forming an adequate counter-bearing, so that deformations could occur under the loading of the clearing blades and the clearing blades could be deflected outwards, that is to say the clearing blades could bend over in an outward direction. In order to prevent this, the device according to the invention advantageously makes provision, according to one development, for a counter-bearing to be additionally provided for each clearing blade. Preferably, each counter-bearing is realized as a bracing element which is arranged on the side wall of the device behind the associated clearing blade in the direction of travel and points in the direction of travel. Although it would also be possible to increase the amount of material in the wall of the device frame in this area, i.e. increase its thickness, the use of a bracing element has, according to one development of the invention, the advantage that the bracing element can be raised about the same horizontal axial line of action, running transversely with respect to the direction of travel, as the associated clearing blade in order to traverse obstacles. If the clearing blade does in fact strike against an obstacle and must therefore be briefly raised, the bracing element, which is intended also to reach down as far as the underlying surface, will also subsequently strike against the obstacle, so that a raising capability of the bracing element is likewise advantageous. If, in addition, the clearing blade and the bracing element pivot about the same axis, an optimum relationship between both components is also ensured during such pivoting movements. For this purpose, the bracing element and the clearing blade are, however, not connected to one another, so that the clearing blade can still be pivoted inwards, while the bracing element continues to point in the direction of travel since the pivoted-in clearing blade does not require any counter-bearing owing to its lack of loading. The clearing blade, which is also made as thin as possible in terms of its materials, can be widened in the correspondingly associated area by means of a stop extension.

A subsequent development of the invention is distinguished in that the implement which can be driven in a rotating fashion comprises essentially a tube which can be driven in a rotating fashion and on the outside of which the tools are arranged and in the interior of which a pressure medium drive with a fixed shaft and a rotating housing which drives the tube is accommodated.

Likewise, for reasons of saving space in the region of the implement itself in order to be able to be able to ensure the greatest possible working width for the implement, a pressure medium drive is thus advantageously used in the device according to the invention, which pressure medium drive is located within the implement, so that no space whatsoever is required outside the implement for this drive, nor for possible connections, gearboxes or the like. The only other thing which is required for such a pressure medium drive is a corresponding pressure medium supply so that therefore a corresponding connection has to be found in the arrangement of the implement on the device frame.

This is achieved in one development of the invention without a substantial space requirement and without disruption, by means of the directly adjacent travelling gear in that the implement has a working position level with the travelling gear, the radius of the tube being selected such that it projects upwards beyond the travelling gear, preferably beyond the wrap areas of driving chains, and that the connection area for the pressure medium supply of the pressure medium drive which is accommodated in the tube is arranged level with that area of an end face of the tube which is located above the travelling gear.

There is a certain amount of room for maneouvre for the selection of the diameter of the tube, and thus of the implement, as long as the diameter of the implement remains relatively small in comparison with the height of the embankment-like heap of the material to be worked. The diameter of the tube can therefore readily be selected according to the invention such that part of the end face protrudes beyond the travelling gear, so that the pressure medium connection can be placed precisely in this protruding area, that is to say where it is not disrupted by the travelling movement, in particular pressure medium hoses or the like cannot become entangled.

However, the pressure medium drive itself is preferably located coaxially in the tube in order to avoid additional gearboxes, so that the pressure medium is also ultimately required in this coaxial area of the tube. It is thus a problem, in the device according to the invention, to conduct the pressure medium from the pressure medium connection at a relatively elevated location in the region of the periphery of the tube into the axial area of the tube without requiring additional space for this or requiring components which could then again disrupt the travelling gear or the rotation of the implement.

Since a pressure medium drive with a fixed shaft is used, that is to say the shaft can be fixedly arranged on the device, a subsequent development of the invention advantageously utilizes the attachment of the shaft itself in order also to span the distance between the pressure-medium connection and the axial area of the tube in a pressure medium-conducting fashion in that attachment flanges, arranged in the interior of the tube as end faces, are provided for attaching the implement to the device, at least one of which attachment flanges has at least one pressure medium passage which connects, in a pressure medium-conducting fashion, a pressure medium connection, which is located above the travelling gear, to a pressure medium feed line, arranged approximately axially in the tube, of the pressure medium drive.

Preferably, a plurality of pressure medium passage sections are designed as holes, axially running areas (also) being used even as screw holes for attachment screws for attaching the flange to the pressure medium drive.

Since the implement is also intended to take hold of material lying on the ground, and for this purpose is arranged as low as possible, the implement may also strike against possible obstacles. Therefore, an additional desirable requirement is also to be able to raise the implement. This further functionality of the implement of course easily leads in turn to additional space being needed, which is undesirable.

This requirement is however fulfilled, in one further development of the device according to the invention which are in that the implement is arranged between two rockers and located in the region of the tracks and with which the said implement can be pivoted about a horizontal axis which runs transversely with respect to the direction of travel. The rockers themselves can be relatively narrow plates which only require very little additional space with regard to the working width of the implement. The attachment flanges are then preferably used for attaching the implement to the rockers.

A further saving in space is achieved in a preferred embodiment of the device according to the invention in that the internal side walls of the device frame have, in the region of the attachment flanges, recesses for mounting attachment screws for attaching the attachment flanges to the rockers from the outside through the rockers.

In order to mount the implement, it can therefore be introduced for example from the front, without, skewing, into the tunnel for the device until the end faces of the tube are located at the attachment points provided. Then, the end faces of the implement are attached to the rockers, in that screws are screwed from the outside through the rockers into the attachment flanges of the implement. For this purpose, the end faces of the device have recesses, so that the rockers are exposed in these areas for the insertion of the screws. The travelling gear is not troublesome either, in particular when a chain drive is used, since it is possible to engage within the wraps of the driving chains. Such engagement would however also be possible for example between two wheels of a travelling gear unit. The attachment flanges have of course been inserted into the end sides of the tube before the attachment of the implement in the tunnel, and have been attached to the pressure medium drive there using, to a certain extent, the pressure medium passages.

Figure 1:
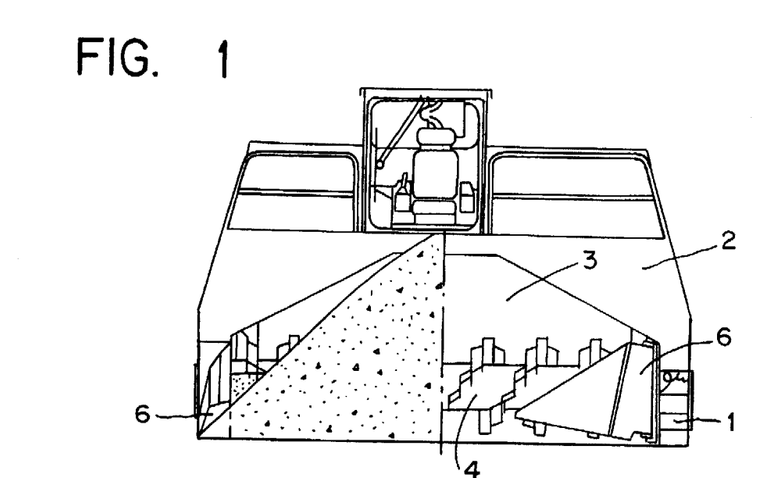
FIG. 1 shows a front view of a device according to the invention.
Figure 2:
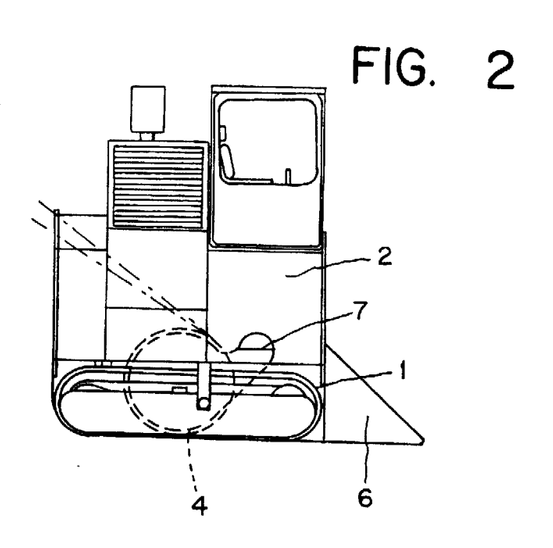
FIG. 2 shows a side view of the device according to FIG. 1.
Figure 3:
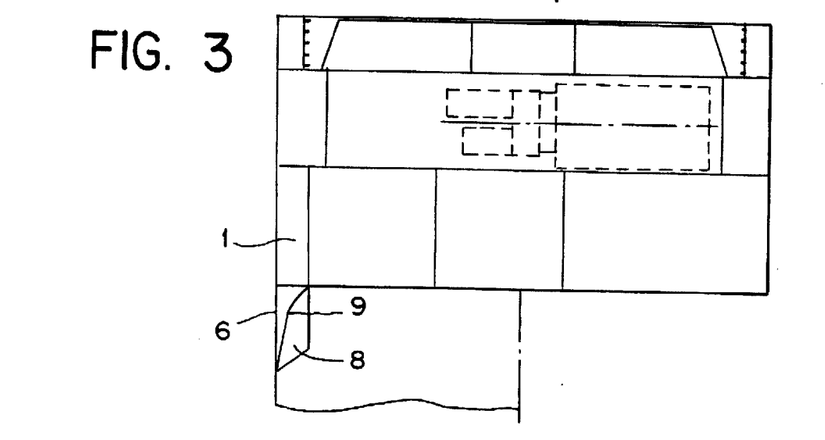
FIG. 3 shows a plan view of the device according to FIGS. 1 and 2.

An exemplary embodiment from which further inventive features emerge is illustrated in the drawing, in which:

FIGS. 1 to 3 show three views of a schematic illustration of a device according to the invention.

The device can be moved on two travelling chains or driving chains 1 of a travelling gear. The actual device body 2 spans the space between the two tracks, formed by the driving chains 1, in the manner of a bridge or gate, leaving free a tunnel 3, which runs through the entire device between the two driving chains 1. Blocking this tunnel 3 and arranged between the two driving chains 1 is an implement 4 which is realized essentially in the form of a roller, is equipped with tools and can be driven in a rotating fashion.

The device also has a driver's cab 5. Mounted in front of each of the two driving chains 1 are clearing blades 6.

The device which is illustrated in FIGS. 1 to 3 serves in particular to move or work embankment-like heaps (ricks) of compostable material. For this purpose, the device moves on the driving chains along such an embankment-like heap in such a way that the driving chains 1 are moved on the left and right next to the heap, while the implement 4 works through the material of the heap. In this process, the embankment-like heap runs through the tunnel 3 as the device moves. For this purpose, the tunnel 3 has a profile which corresponds approximately to the cross-sectional profile of such an embankment-like heap, which is of course somewhat more bell-shaped in its cross-section. The implement 4 is used to work, churn up and throw up the material of the heap and also to throw it back a certain distance counter to the direction of travel, so that such an embankment-like heap is arranged offset to the rear in the longitudinal direction by a specific distance after the working.

The clearing blades 6 serve to keep the tracks of the driving chains 1 free and to push any material which may be present in this area forcibly into the space between the tracks, that is to say onto the embankment-like heap.

It is already clear from FIGS. 1 to 3 that the clearing blades 6 can be pivoted from a working position pointing in the direction of travel into a position of rest, in which they are each located transversely with respect to the direction of travel and point into the space between the tracks of the driving chains 1. In this position of rest, they are also raised by an adjustment angle. The implement 4 can also be raised by pivoting about a pivot axis 7. In addition, it is clear from FIG. 3 that each clearing blade has a shovel-like slope 8 which tapers to a point towards its front in order to dig into any material which may be present. This slope is bounded on the outside and at the rear of the slope 8 by a guide face 9 which has an essentially arcuate course and guides the material into the space between the tracks of the driving chains 1.

Figure 4:
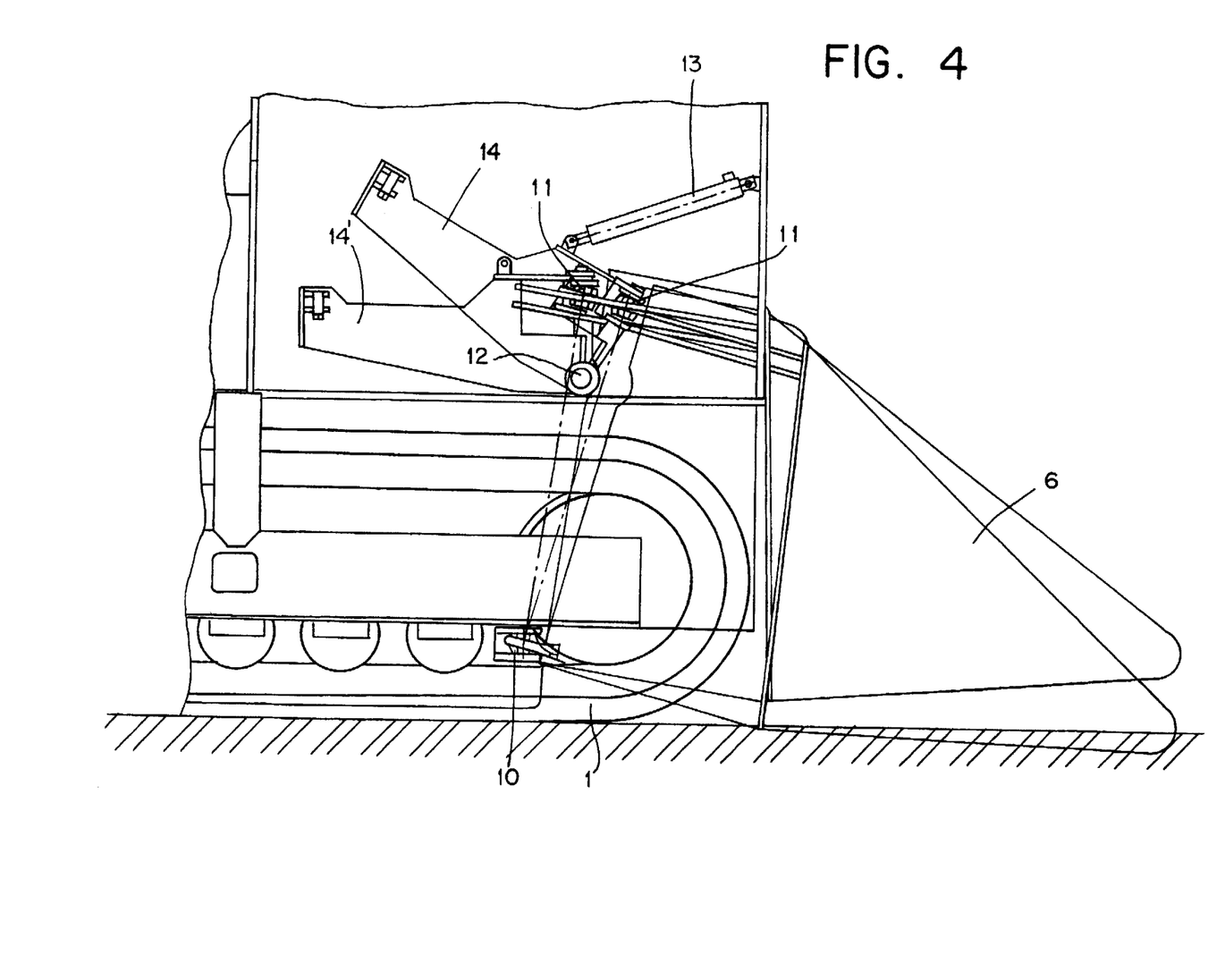
FIG. 4 shows a movement study in the area of the clearing apparatus of the device according to FIG. 2, which area is enlarged and more detailed in comparison with FIG. 2.

FIG. 4 shows in more detail, viewed from the space between the tracks of the driving chains 1, the clearing apparatus in front of one of the driving chains 1 which comprises a clearing blade 6. FIG. 4 shows a movement study relating to this clearing blade 6.

The clearing blade 6 can be pivoted into the position of rest about coupling points 10 and 11 which together define a pivot-axis line of action, which is inclined with respect to the vertical, for the clearing blade 6, so that the clearing blade 6 can not only be pivoted in about these coupling points 10, 11 but is also simultaneously raised by an adjustment angle. The clearing blade 6 is pivoted by means of a hydraulic cylinder, which is not shown in FIG. 4.

However, the coupling point 11 can also be pivoted about a pivot spindle 12 with respect to the coupling point 10, which is realized as a ball-and-socket joint, into a position 11', specifically by means of a hydraulic cylinder 13. As a result, the clearing blade which points in the direction of travel can thus also be raised about the pivot spindle 12 by an adjustment angle in order to be able to travel over possible obstacles. A restoring force can ensure that the clearing blade 6 returns into its working position in a sprung fashion. For this purpose, it is for example possible, on the one hand, to keep the hydraulic cylinder 13 in an activation standby state or, on the other hand, even to move it into a floating position.

It is also clear from FIG. 4 that in particular the lower coupling point 10 is accommodated within the wrap of the driving chain 1, while the upper coupling point 11, the pivot spindle 12 and an auxiliary structure 14, on which the hydraulic cylinder 13 acts in order to pivot the clearing blade 6, are arranged above the driving chain 1, but in the vertical plane of the driving chain 1.

Figure 5:
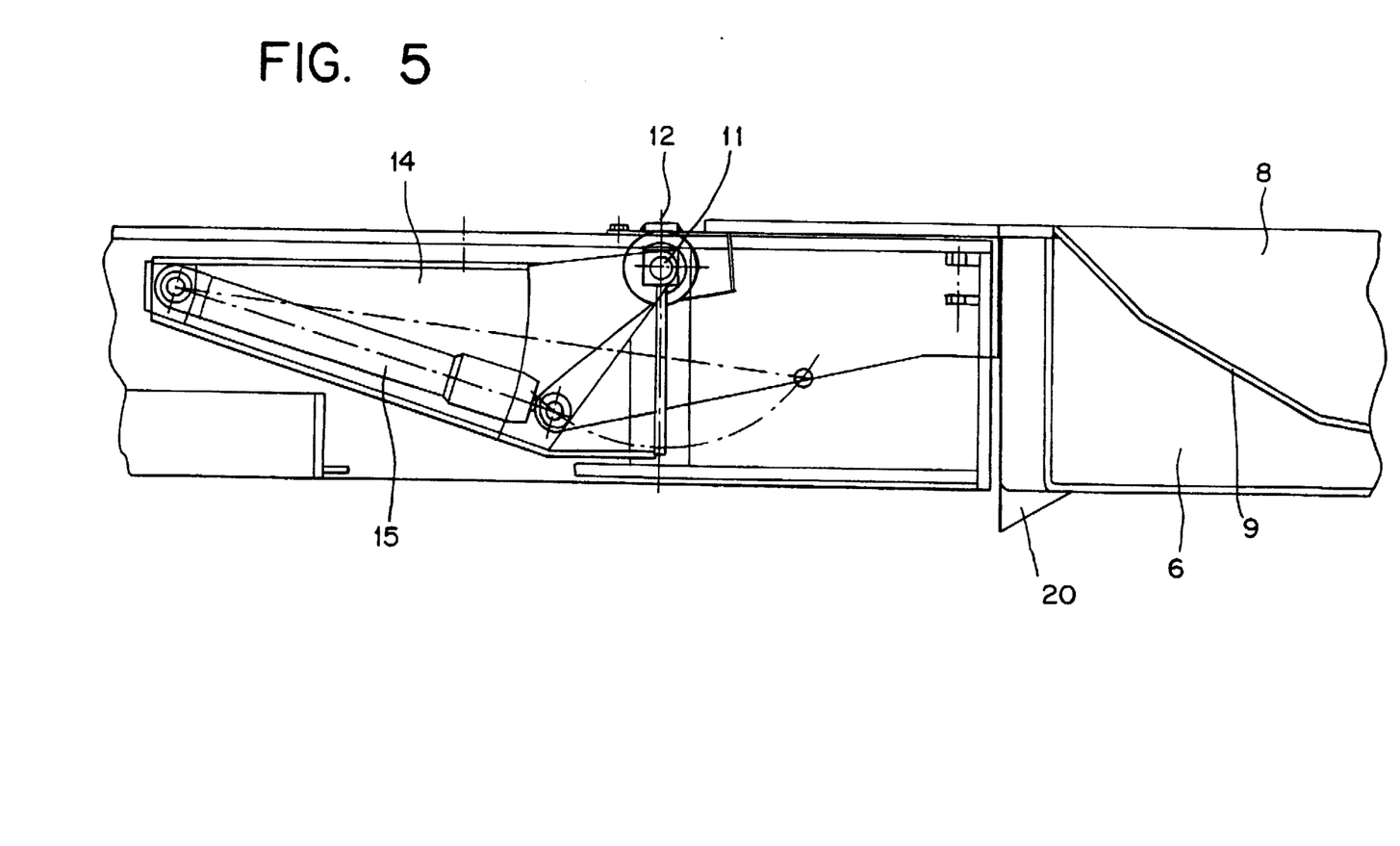
FIG. 5 shows a plan view of the clearing apparatus of the device according to the invention.

FIG. 5 shows a plan view of the clearing apparatus according to FIG. 4. This plan view shows the hydraulic cylinder 15 which serves to pivot in and pivot out the clearing blade 6.

In addition, FIG. 5 shows that the entire clearing apparatus actually lies in the same plane as the driving chain 1, which has sufficient space to run through between the clearing blade 6 and the auxiliary structure 14.

Figure 6:
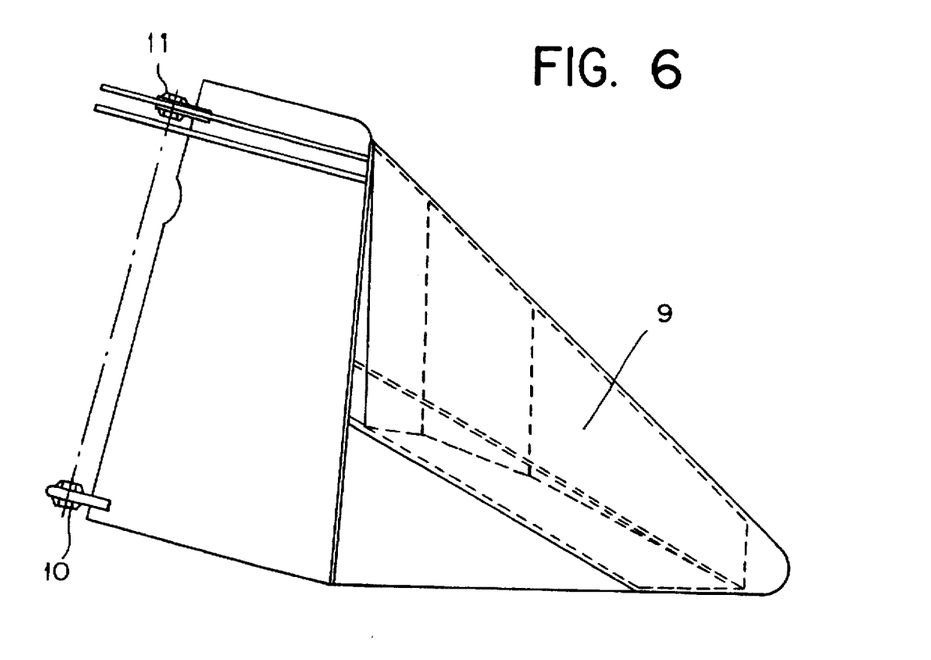
FIG. 6 shows a side view of a clearing blade of the clearing apparatus according to FIG. 5.
Figure 7:
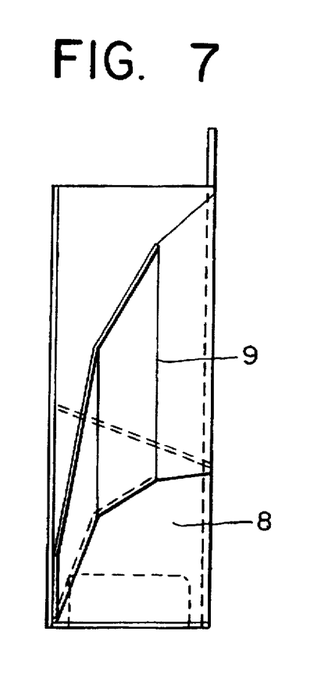
FIG. 7 shows a front view of the clearing blade according to FIG. 6.
Figure 8:
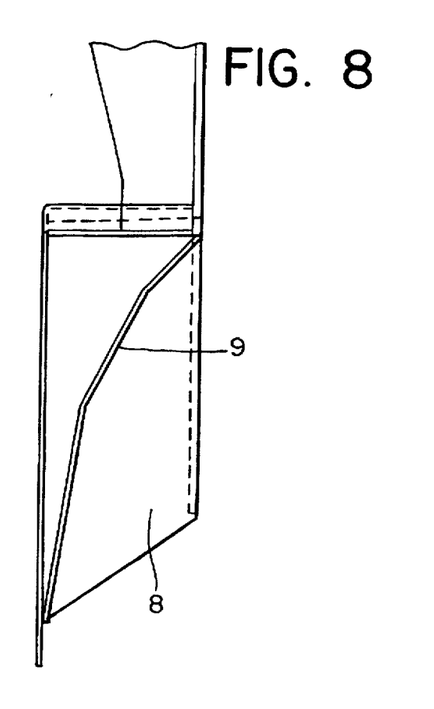
FIG. 8 shows a plan view of the clearing blade according to FIGS. 6 and 7.

FIGS. 6 to 8 show once again a clearing blade 6 in greater detail. In particular, these figures show that the guide face 9 is composed of planar partial areas which follow the course of a polygon and as a result together assume essentially an arcuate course, albeit a canted arcuate course.

Figure 9:
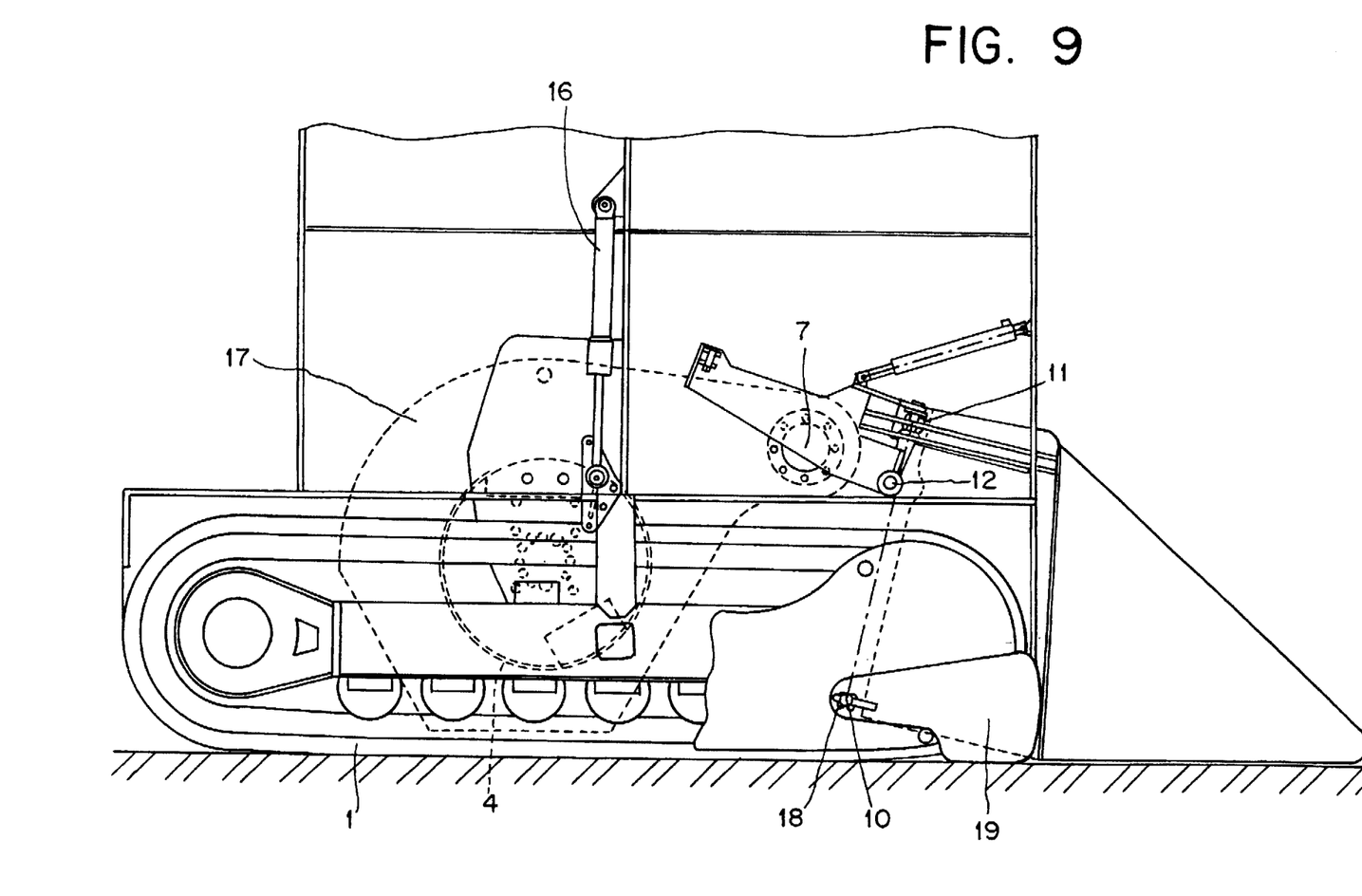
FIG. 9 shows an enlarged and more detailed view of the area of the implement of a device according to the invention, with the implement in the working position.
Figure 10:
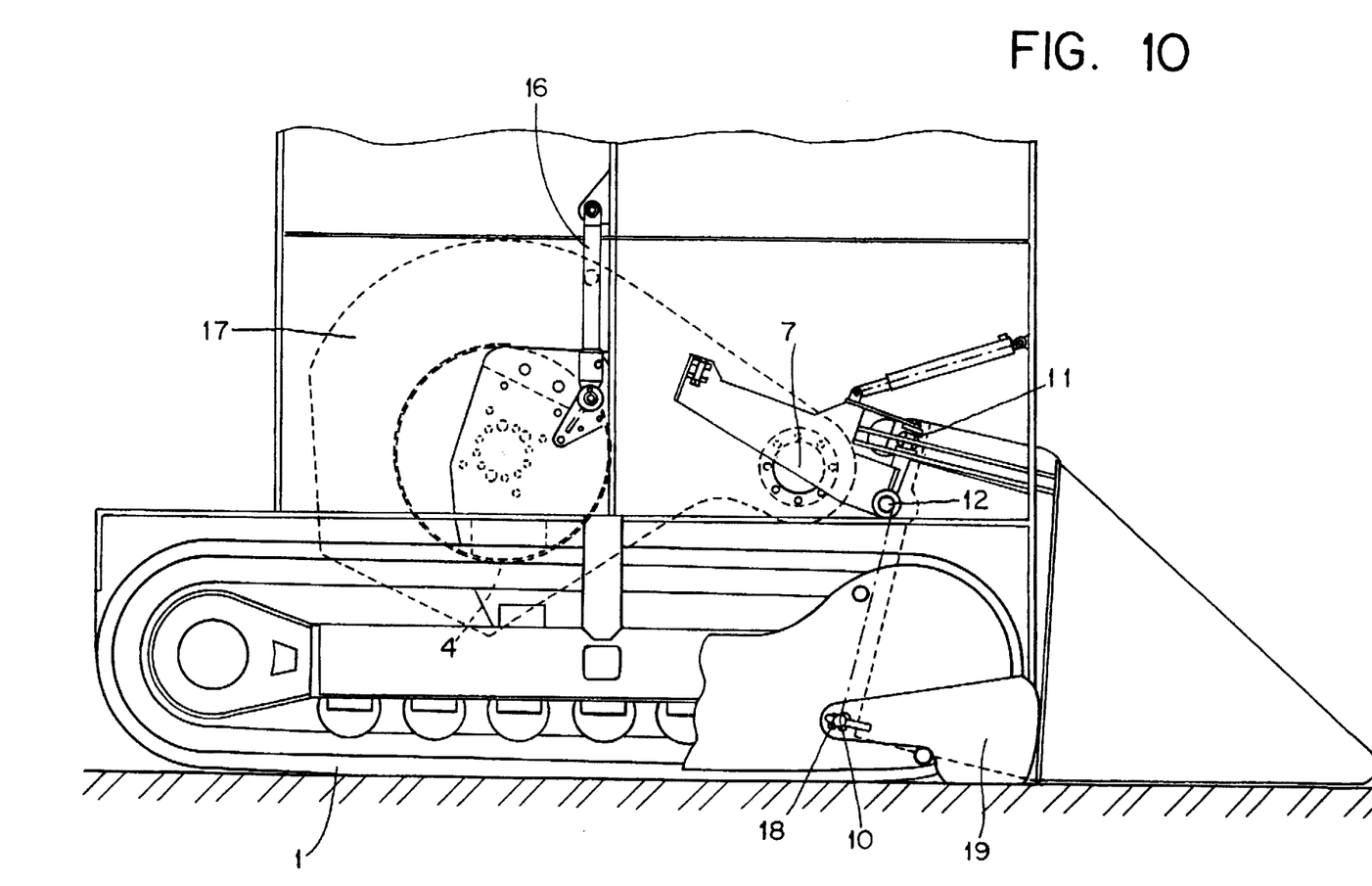
FIG. 10 shows the area according to FIG. 9, with the implement in the raised position.

FIGS. 9 and 10 show in more detail that the implement 4 can be pivoted about a pivot axis 7 and can be raised and lowered as a result, specifically with the aid of a working cylinder 16.

The lowered position of the implement 4 in FIG. 9 is the working position. Indicated in FIG. 9 in the circular face enclosed by the tube of the implement 4 are a number of holes, some of which symbolize attachment screws for attaching the implement 4 to rockers 17 for pivoting the implement about the pivot axis 7, but some of which also indicate pressure medium-conducting passages for a pressure medium supply to a pressure medium drive in the interior of the implement 4. FIG. 9 shows that, also in the working position of the implement 4, the top circular symbols, which symbolize pressure medium connections, are located above the wrap of the driving chain 1, but within the circumference of the implement 4.

In addition, FIGS. 9 and 10 show a bracing element 19 which can be raised about a pivot axis 18 and which acts as a counter-bearing for the pivoted-out clearing blade 6 and correspondingly interacts with the stop 20 (indicated in FIG. 5) of the clearing blade 6.

The pivot axis 18 of the bracing element 19 lies on a line with the lower coupling point 10 of the clearing blade 6.

Figure 11:
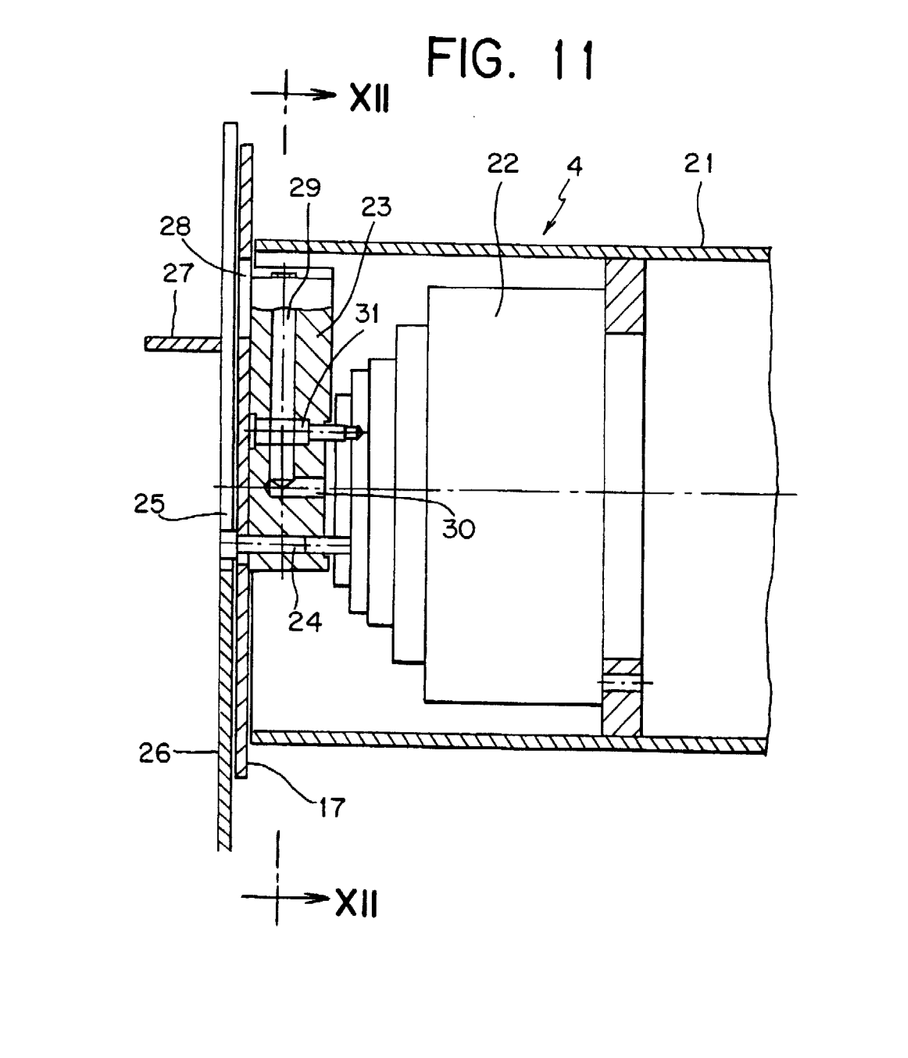
FIG. 11 shows an enlarged detail of an end area of the implement of the device according to the invention.
Figure 12:
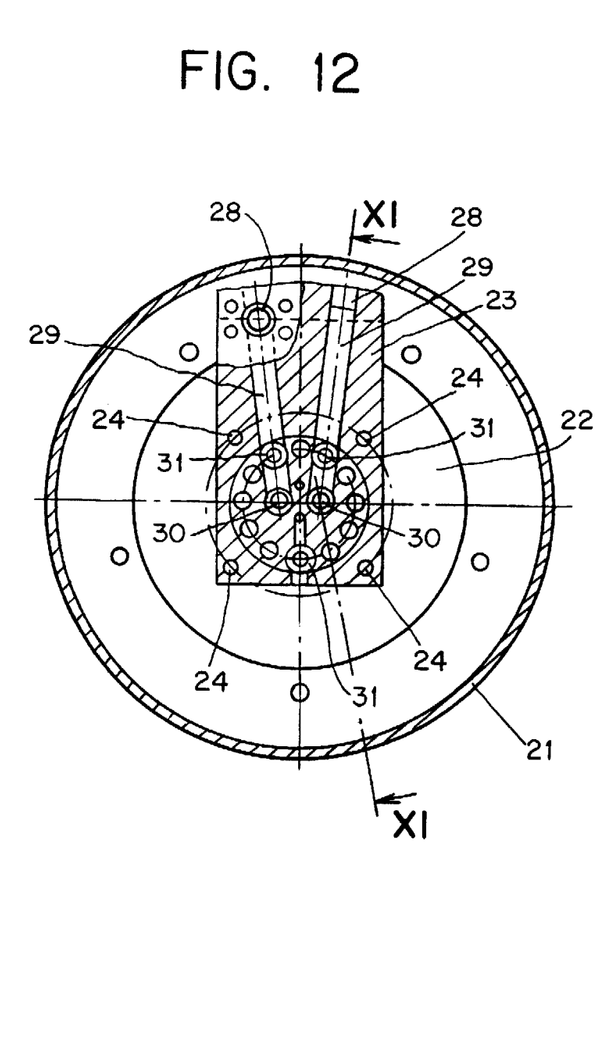
FIG. 12 shows the area according to FIG. 11 in another sectional view along the dot-dash line designated in FIG. 11 by XII, XII.

The positional relationships of the holes indicated only symbolically in the end face of the implement 4 are illustrated in greater detail in FIGS. 11 and 12.

FIG. 11 shows an end area of the implement 4, the actual tools having been omitted from the illustration.

The implement has a tube 21. In this tube 21 there is a pressure medium drive 22 (not illustrated in greater detail) which is connected in terms of drive to the tube 21. The fixed shaft of the pressure medium drive 22 is connected to a rocker 17 via an attachment flange 23. Attachment screws 24 for attaching the attachment flange 23 to the rocker 17 can be mounted from the outside through a recess 25 in the device frame 26.

Within the end face of the tube 21 there are, above a cover 27 for the driving chain 1, pressure medium connections 28 (indicated only schematically) for the pressure medium drive 22. From the area of these pressure medium connections 28, pressure medium passages 29 run within the attachment flange 23 to feed lines and/or discharge lines 30 of the pressure medium drive 22. The pressure medium passages 29 are at least partially realized as holes. Some of these holes are also used for attachment screws 31 for attaching the attachment flange 23 to the pressure medium drive 22 or to its fixed shaft.

FIG. 12 shows an end view of the implement 4, but reduced to the tube 21 and the attachment flange 23. Identical components are designated with the same reference numerals as in FIG. 11.,

We claim:

1. Mobile device for working and moving heaps of compostable materials and of materials which are suitable for a landfill comprising travelling gear which can be moved on two tracks, an implement which is driven in a rotating fashion and is arranged essentially transversely with respect to the direction of travel within a space between the tracks of the travelling gear and within a tunnel for the material to pass through;

two track clearing devices which are arranged in front of the two tracks of the travelling gear in the direction of travel, take up approximately the width of the respective track and force the material located in front of the tracks into the space between the tracks;

each clearing device comprising a blade which is pivotable and also raisable from a working position pointing approximately in the direction of travel into a position of rest approximately transverse with respect to the direction of travel;

each blade is a clearing blade pivotable into a position of rest into the space between the tracks and simultaneously pivotable and raisable into the position of rest by virtue of the fact that during pivoting it is adjustable by an angle relative to the ground such that the blade projects upwards in the direction of its free end;

wherein in a position pointing in the direction of travel, the clearing blade is raisable to an adjustment angle in order to overcome obstacles in that the blade is pivotable about an axial line of action around a pivot spindle running transversely with respect to the direction of travel; and means for raising the clearing blade counter to a restoring spring means.

2. Mobile device for working and moving heaps, of compostable materials and of materials which are suitable for a landfill, comprising travelling gear which can be moved on two tracks, an implement which is driven in a rotating fashion and is arranged essentially transversely with respect to the direction of travel within a space between the tracks of the travelling gear and within a tunnel for the material to pass through;

two track clearing devices which are arranged in front of the two tracks of the travelling gear in the direction of travel, take up approximately the width of the respective track and force the material located in front of the tracks into the space between the tracks;

each clearing device comprising a blade which is pivotable and also raisable from a working position pointing approximately in the direction of travel into a position of rest approximately transverse with respect to the direction of travel;

each blade is a clearing blade pivotable into a position of rest into the space between the tracks and simultaneously pivotable and raisable into the position of rest by virtue of the fact that during pivoting it is adjustable by an angle relative to the ground such that the blade projects upwards in the direction of its free end;

wherein a working cylinder has elements for activating and coupling the clearing blade in the vertical plane of the respectively associated track; and wherein the travelling gear has a driving chain for each track, and at least some of the elements for activating and coupling the associated clearing blade are accommodated within a wrap area of the driving chain.

3. Device according to claim 2, wherein each of the two driving chains has in each case chain covers which protrude on both sides beyond a respective chain width, and in that at least some of the elements of the clearing blade arranged in front of this driving chain are accommodated in a wrap area of a protruding length of the chain covers which points inwardly into the space between the tracks.

4. Mobile device for working and moving heaps, of compostable materials and of materials which are suitable for a landfill, comprising travelling gear which can be moved on two tracks, an implement which is driven in a rotating fashion and is arranged essentially transversely with respect to the direction of travel within a space between the tracks of the travelling gear and within a tunnel for the material to pass through;

two track clearing devices which are arranged in front of the two tracks of the travelling gear in the direction of travel, take up approximately the width of the respective track and force the material located in front of the tracks into the space between the tracks;

each clearing device comprising a blade which is pivotable and also raisable from a working position pointing approximately in the direction of travel into a position of rest approximately transverse with respect to the direction of travel;

each blade is a clearing blade pivotable into a position of rest into the space between the tracks and simultaneously pivotable and raisable into the position of rest by virtue of the fact that during pivoting it is adjustable by an angle relative to the ground such that the blade projects upwards in the direction of its free end;

wherein said clearing blade is pivotable about a pivot-axis line of action which is inclined with respect to the vertical in the direction of travel;

wherein the pivot-axis line of action which is inclined with respect to the vertical is movable into a more vertical position in order to permit the clearing blade which points in the direction of travel to be raised;

wherein the pivot-axis line of action which is inclined with respect to the vertical is defined by two coupling points which are not connected to one another, one coupling point is an upper coupling point which is movable with respect to the other coupling point, which is a lower coupling point over an arc; and wherein in order to define the pivot-axis line of action of the clearing blade, the lower coupling point is arranged within a wrap of an associated driving chain, while the upper coupling point is arranged above the wrap.

5. Mobile device for working and moving heaps, of compostable materials and of materials which are suitable for a landfill, comprising travelling gear which can be moved on two tracks, an implement which is driven in a rotating fashion and is arranged essentially transversely with respect to the direction of travel within a space between the tracks of the travelling gear and within a tunnel for the material to pass through;

two track clearing devices which are arranged in front of the two tracks of the travelling gear in the direction of travel, take up approximately the width of the respective track and force the material located in front of the tracks into the space between the tracks;

each clearing device comprising a blade which is pivotable and also raisable from a working position pointing approximately in the direction of travel into a position of rest approximately transverse with respect to the direction of travel;

each blade is a clearing blade pivotable into a position of rest into the space between the tracks and simultaneously pivotable and raisable into the position of rest by virtue of the fact that during pivoting it is adjustable by an angle relative to the ground such that the blade projects upwards in the direction of its free end; and a counter-bearing for each of two clearing blades which are pivoted in the direction of travel and in the working direction, in order to limit the respective pivoting travel and in order to prevent the respective clearing blade from being deflected out of the track under clearing load.

6. Device according to claim 5, wherein each counter-bearing is a bracing element which is arranged on a side wall of the device behind the associated clearing blade in the direction of travel and points in the direction of travel.

7. Device according to claim 6, wherein for bearing against the associated bracing element, the respective clearing blade has a stop extension on the outside.

8. Mobile device for working and moving heaps, of compostable materials and of materials which are suitable for a landfill, comprising travelling gear which can be moved on two tracks, an implement which is driven in a rotating fashion and is arranged essentially transversely with respect to the direction of travel within a space between the tracks of the travelling gear and within a tunnel for the material to pass through;

two track clearing devices which are arranged in front of the two tracks of the travelling gear in the direction of travel, take up approximately the width of the respective track and force the material located in front of the tracks into the space between the tracks;

each clearing device comprising a blade which is pivotable and also raisable from a working position pointing approximately in the direction of travel into a position of rest approximately transverse with respect to the direction of travel;

each blade is a clearing blade pivotable into a position of rest into the space between the tracks and simultaneously pivotable and raisable into the position of rest by virtue of the fact that during pivoting it is adjustable by an angle relative to the ground such that the blade projects upwards in the direction of its free end;

wherein in a position pointing in the direction of travel, the clearing blade is raisable to an adjustment angle in order to overcome obstacles in that the blade is pivotable about an axial line of action around a pivot spindle running transversely with respect to the direction of travel; and wherein a bracing element is raisable about the same horizontal axial line of action running transversely with respect to the direction of travel, as the associated clearing blade in order to traverse obstacles.

9. Mobile device for working and moving heaps, of compostable materials and of materials which are suitable for a landfill, comprising travelling gear which can be moved on two tracks, an implement which is driven in a rotating fashion and is arranged essentially transversely with respect to the direction of travel within a space between the tracks of the travelling gear and within a tunnel for the material to pass through;

two track clearing devices which are arranged in front of the two tracks of the travelling gear in the direction of travel, take up approximately the width of the respective track and force the material located in front of the tracks into the space between the tracks;

each clearing device comprising a blade which is pivotable and also raisable from a working position pointing approximately in the direction of travel into a position of rest approximately transverse with respect to the direction of travel;

each blade is a clearing blade pivotable into a position of rest into the space between the tracks and simultaneously pivotable and raisable into the position of rest by virtue of the fact that during pivoting it is adjustable by an angle relative to the ground such that the blade projects upwards in the direction of its free end; and wherein in order to raise the material to be cleared, each clearing blade has a shovel-like slope which rises from a front end to a rear, is open at the front end and on an inside and is bounded on an outside and at the rear by a guide face for the material, which guide face runs transversely from the outside of the slope essentially in an arc into a lacuna at the rear and points and leads into the space between the tracks.

10. Device according to claim 9, wherein the arcuate course of the guide face comprises straight and planar partial guide sections which are joined to one another at an angle and form a polygon.

11. Device according to claim 9, wherein the slope of the clearing blade is bevelled at its front in such a way that it tapers to a point towards its outside.

* * * * *